US010055357B2

(12) United States Patent
Vidyadhara et al.

(10) Patent No.: US 10,055,357 B2
(45) Date of Patent: Aug. 21, 2018

(54) SYSTEMS AND METHODS FOR SECURE MULTI-ACCESS OF SYSTEM FIRMWARE DURING PRE-BOOT

(71) Applicants: Sumanth Vidyadhara, Bangalor (IN); Vijay B. Nijhawan, Austin, TX (US)

(72) Inventors: Sumanth Vidyadhara, Bangalor (IN); Vijay B. Nijhawan, Austin, TX (US)

(73) Assignee: Dell Products LP, Round Rock, TX (US)

( * ) Notice: Subject to any disclaimer, the term of this patent is extended or adjusted under 35 U.S.C. 154(b) by 272 days.

(21) Appl. No.: 15/058,754

(22) Filed: Mar. 2, 2016

(65) Prior Publication Data

US 2017/0255567 A1 Sep. 7, 2017

(51) Int. Cl.

| | |
|---|---|
| ***G06F 12/1081*** | (2016.01) |
| ***G06F 13/16*** | (2006.01) |
| ***G06F 13/28*** | (2006.01) |
| ***G06F 13/42*** | (2006.01) |
| ***G06F 21/57*** | (2013.01) |
| *G06F 12/1027* | (2016.01) |

(52) U.S. Cl.

CPC ...... *G06F 12/1081* (2013.01); *G06F 13/1668* (2013.01); *G06F 13/28* (2013.01); *G06F 13/42* (2013.01); *G06F 21/57* (2013.01); *G06F 12/1027* (2013.01); *G06F 2221/034* (2013.01)

(58) Field of Classification Search

CPC ............. G06F 12/1081; G06F 12/1009; G06F 9/4401; G06F 13/1668; G06F 13/28; G06F 12/1027; G06F 21/57; G06F 13/42

See application file for complete search history.

(56) References Cited

U.S. PATENT DOCUMENTS

2015/0067297 A1 3/2015 Arroyo et al.
2015/0134945 A1* 5/2015 Takami ................ G06F 9/4401 713/2

OTHER PUBLICATIONS

Intel, "Intel Virtualization Technology for Directed I/O", Oct. 2014, 272 pgs.
Forristal, "Hardware Involved Software Attacks", Obtained from Internet on Oct. 9, 2015; 22 pgs.
Sang et al., "I/O Attacks in Intel-PC Architectures and Countermeasures", Jul. 2011, 27 pgs.
Yao et al., "A Tour Beyond BIOS Using Intel VT-d for DMA Protection in UEFI BIOS", White Paper, Jan. 2015, 27 pgs.
Doran et al., "UEFI Boot Time Optimization Under Microsoft Windows 7", Intel Developer Forum, 2009, 34 pgs.

(Continued)

*Primary Examiner* — Ernest Unelus
(74) *Attorney, Agent, or Firm* — Egan Peterman Enders Huston

(57) ABSTRACT

Systems and methods are provided that may be implemented to systems and methods that may be implemented to utilize direct memory access (DMA) remapping to control firmware updates and/or other configuration changes or device access control protocol for devices of an information handling system during the Unified Extensible Firmware Interface (UEFI) pre-boot phase before the booting the operating system (OS). The disclosed systems and methods may use DMA remapping during UEFI pre-boot to determine whether to allow or disallow pre-boot firmware updates and/or device configuration for hardware devices, and may be performed in the presence or absence of UEFI Secure Boot.

22 Claims, 5 Drawing Sheets

(56) References Cited

OTHER PUBLICATIONS

Aumaitre et al., "Subverting Windows 7x64 Kernel With DMA Attacks", Obtained from Internet on Oct. 9, 2015; 44 pgs.
"Chapter 1, What is UEFI Secure Boot?", Printed from Internet Feb. 22, 2016, 3 pgs.
Burger, "Intel Virtualization Technology for Directed I/O (VT-d): Enhancing Intel Platforms for Efficient Virtualization of I/O Devices", Mar. 2012, 8 pgs.
Ott, "Understanding VT-d: Intel Virtualization Technology for Directed I/O", Obtained from Internet on Jan. 23, 2016; 2 pg.
Insyde, UEFI Spec Version 2.4, Facilitates Secure Update, Jul. 2013, 29 pgs.

* cited by examiner

SYSTEMS AND METHODS FOR SECURE MULTI-ACCESS OF SYSTEM FIRMWARE DURING PRE-BOOT

FIELD

This invention relates generally to information handling systems and, more particularly, to firmware handling for information handling system components.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hardware related attacks on an information handling system can bypass any software checks and corrupt system memory. This may occur in both PreBoot and operating system (OS) Space whether Unified Extensible Firmware Interface (UEFI) Secure Boot is enabled or not. One particular problem exists in the Pre Boot environment with hardware security during direct memory access (DMA) transaction/s that allow a connected hardware device to bypass the system CPU and directly read and write system memory. A hardware device may begin in a malicious state and to explicitly perform an attack when connected to the system. Alternatively, a connected hardware device may be reprogrammed by a malicious local software agent to put the device into a malicious state.

SUMMARY

Disclosed herein are systems and methods that may be implemented to utilize direct memory access (DMA) remapping to control and handle firmware updates and/or other configuration changes or device access control protocol for devices of an information handling system during the Unified Extensible Firmware Interface (UEFI) pre-boot phase or pre-OS shell before the OS boots. In one embodiment, the disclosed systems and methods may use DMA remapping during UEFI pre-boot to determine whether to allow or disallow pre-boot firmware updates and/or device configuration for hardware devices (e.g., such as basic input/output system (BIOS) SPI flash or chip, non-volatile dual inline memory modules (NVDIMMs), volatile dual inline memory module (DIMM) devices, power supply unit (PSU), complex programmable logic devices (CPLDs), Peripheral Component Interconnect Express (PCIe) Devices, etc.) that are coupled to a host processing device of an information handling system, such as a computer server, desktop computer, notebook computer, etc. In this way, such hardware devices that would conventionally be vulnerable to hardware attack are protected from any hardware attacks that may be instantiated during firmware updates. Examples of memory and hardware devices that may be protected from malware attack during pre-boot include, for example, host bridge-connected devices such as platform controller hub (PCH)-connected system memory devices (e.g., DRAM) and memory controller hub (MCH)-connected devices (e.g., DRAM), as well as IO devices having memory (e.g., hardware registers), etc.

Advantageously, DMA remapping (e.g., such as using Intel Virtualization Technology for Directed I/O (VT-d)) may be used in one embodiment to prevent hardware device attack from malware during pre-boot firmware updating (e.g., such as Firmware Management Protocol "FMP"—based pre-boot firmware update operations) to such hardware devices. DMA mapping may be so implemented to provide separate input/output (IO) memory address mapping for each device that is only known to UEFI components that are present and executing on the information handing system. In this way, protection of hardware and firmware may be achieved in a pre-boot environment, e.g., in either a secure boot or non-secure boot UEFI environment. Using the disclosed systems and methods, if malware tries to update hardware device firmware or the configuration of a hardware device without owning or otherwise having knowledge of the correct DMA address translation, the information handling system will generate a DMA protection non-maskable interrupt (NMI) failure due to malware unauthorized access attempt to system memory and will protect the system from malware attack. Thus, using the disclosed systems and methods may be implemented to ensure a safe and secure firmware update and/or safe and secure system configuration update in pre-boot space in a manner that is secure from hardware attack/s.

In one respect, disclosed herein is an information handling system, including: at least one processing device configured to execute a host operating system (OS); and at least one given hardware device coupled in data communication with the processing device. The processing device may be configured to access and utilize stored direct memory access (DMA) remapping information stored in memory of the information handling system to translate a firmware-requested memory address to an actual hardware IO device address for the given hardware device coupled to the processing device to perform a requested firmware update or other requested device access control protocol for the given hardware device prior to loading a host operating system (OS) for the information handling system.

In another respect, disclosed herein is a method including using at least one processing device of an information handling system to access and utilize stored direct memory access (DMA) remapping information to translate a firmware-requested memory address to an actual hardware IO device address for a given hardware device coupled to the processing device to perform a requested firmware update or other requested device access control protocol for the given hardware device prior to loading a host operating system (OS) for the information handling system.

DESCRIPTION OF ILLUSTRATIVE EMBODIMENTS

Figure 1:
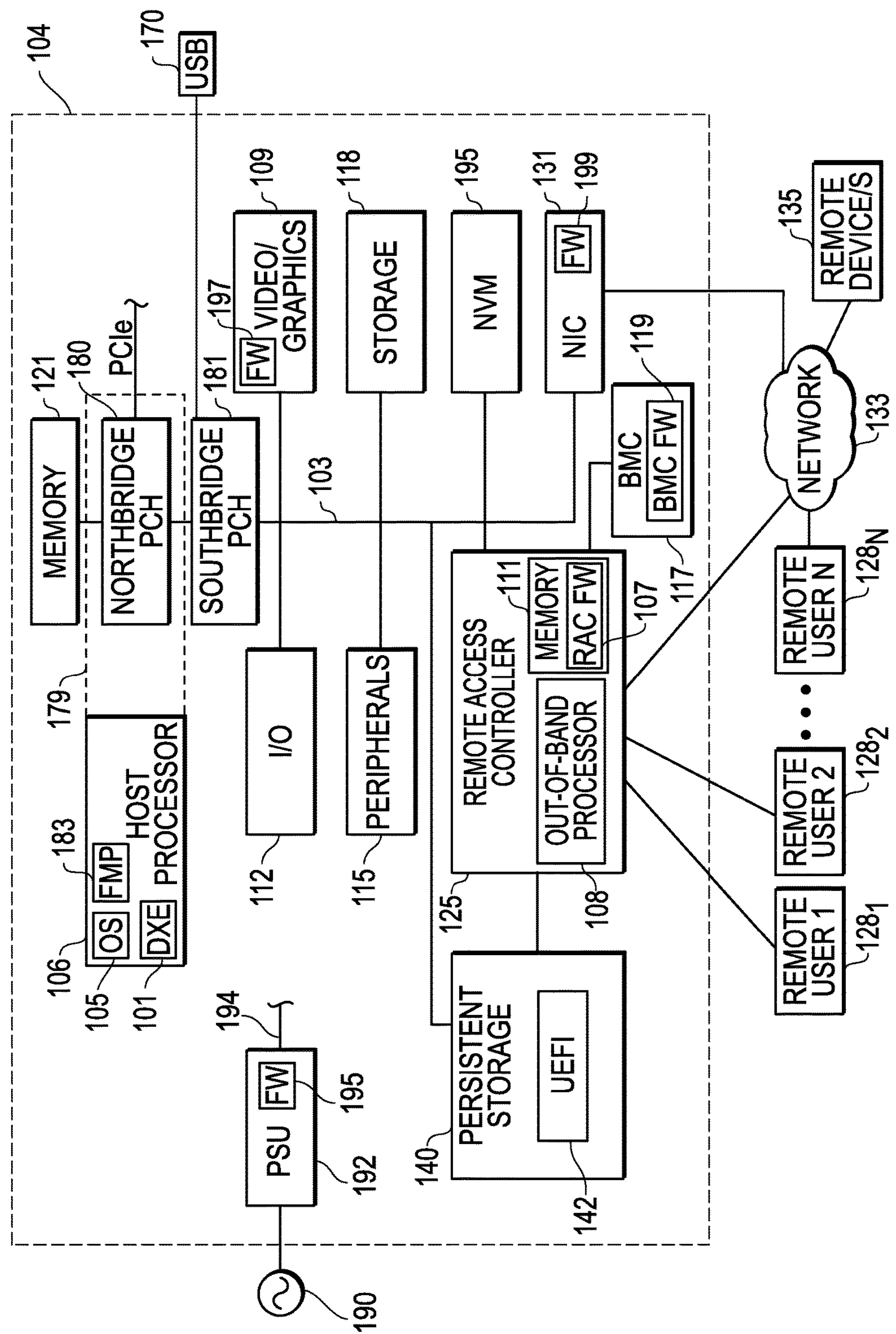
FIG. 1 illustrates a block diagram of an information handling system according to one exemplary embodiment of the disclosed systems and methods.

FIG. 1 is a block diagram of an information handling system 104 (e.g., such as a server) as it may be configured according to one exemplary embodiment. As shown, system 104 may include one or more host processing device/s 106 (e.g., AMD or Intel-based CPU such as Itanium or any other type of suitable host processing device), one or more buses or communication media 103 (e.g., PCIe bus, USB, SMBus, SATA, other appropriate data buses such as memory bus, etc.), video/graphics hardware (e.g., video adapter or graphics processor unit) 109 (with video/graphics component firmware 197), storage 118, system volatile memory (e.g., DRAM) 121, local input/output (I/O) 112, peripherals 115, and remote access controller (RAC) 125 having one or more out-of-band processing devices 108 and memory 111 that stores remote access controller component firmware 107. Examples of remote access controller 125 include an integrated Dell Remote Access Controller (iDRAC) available from Dell Products L.P. of Round Rock, Tex., etc.). As shown in the exemplary embodiment of FIG. 1, out-of-band processing device 108 is a separate and independent processing device from any in-band host central processing unit (e.g., CPU) such as host processing device/s 106 that is configured to load and run UEFI 142 (with DXE loader 101 and firmware management protocol "FMP" 183 as shown) as well as host OS 105 (e.g., Windows-based OS, Linux-based OS, etc.). In this regard, out-of-band processing device 108 may operate without management of UEFI 142, any separate system BIOS and any application executing with a host OS 105 on the host processing device/s 106.

Bus/es 103 provides a mechanism for the various components of system 104 to communicate and couple with one another. As shown, host processing device/s 106 may be coupled in on embodiment to bus/es 103 via hostbridge 180 that may be a separate component (e.g., such as a Northbridge chip) or its functions may be integrated within host processing device 106 as illustrated by dashed line 179 in FIG. 1. In either case, hostbridge 180 is directly coupled to system memory 121 as shown, while hostbridge 180 may be coupled through either through a separate Southbridge chip (or platform controller hub "PCH" chip) 181 to facilitate input/output functions for the processing device/s 106 with various internal system components of information handling system 104 through bus/es 103 such as PCI, PCIe, SPI, USB, low pin count (LPC), etc. Examples of such system components that may be accessed through Southbridge/PCH 181 with DMA include, but are not limited to, non-volatile memory (NVM) device/s 195, persistent storage 140, BIOS SPI Flash, NVDIMMS, DIMMS, PCIe Devices, etc.

In one embodiment, host processing device/s 106 may be an in-band processing device configured to run a host operating system (OS) 105, and out-of-band processing device 108 of remote access controller 125 may be a service processor, baseboard management controller (BMC) embedded processor, etc. Other coupled components that may be present include video/graphics 109, storage 118, system memory 121, I/O 112, NVM and peripherals 115 (e.g., keyboard, mouse, etc.). Besides volatile memory 121 (e.g., random access memory "RAM"), processor 106 may include cache memory for storage of frequently accessed data, and storage 118 may include extended memory for processing device/s 106. Information handling system 104 may also include a network access card (NIC) 131 (with its component firmware 199) that is communicatively coupled to network 133 (e.g., Internet or corporate intranet) as shown to allow various components of system 104 to communicate with external and/or remote device/s 135 across network 133. Other external devices, such as an external universal serial bus (USB) device 170 may be coupled to processing device/s 106 via Southbridge/PCH 181. In this embodiment, information handling system 104 also includes power supply unit (PSU) 192 (including PSU component firmware 195) that is coupled to receive power from AC mains 190 and to perform appropriate power conversion and voltage regulation to produce regulated internal power 194 for use by other power-consuming components of system 104.

Still referring to FIG. 1, remote access controller 125 is coupled to persistent non-volatile memory storage 140 (e.g., embedded and partitioned flash memory, Electrically Erasable Programmable Read Only Memory—EEPROM, other types of non-volatile random access memory "NVRAM", etc.) that is configured to store persistent information for remote access controller 125 and information for other system components, e.g., including Unified Extensible Firmware Interface (UEFI) firmware 142 as well as other information such as Advanced Configuration and Power Interface (ACPI) information, other system BIOS firmware (e.g., in the form of system management SMBIOS data), etc. It will be understood that system persistent storage 140 may be implemented by one or more non-volatile memory storage devices and that in other embodiments, non-volatile memory or other non-volatile memory storage device/s (e.g., such as hard disk drive and/or optical drive, etc.) may also or alternatively be provided elsewhere in system 104 for storing such information, e.g., such as media drives of storage 118. In this embodiment, system 104 also includes a baseboard management controller (BMC) 117 that is communicatively coupled to remote access controller 125 as shown. BMC 117 includes integrated non-volatile memory 119 for storing BMC component firmware 119 for execution by BMC 117. As shown, in the embodiment of FIG. 1 remote access controller 125 optionally may provide access to a plurality of remote users $\mathbf{128}_1$-$\mathbf{228}_N$, although access may be provided to a single user 128 in other embodiments. In this regard, remote access controller 125 may be configured to allow remote users to manage, administer, use, and/or access various resources of host system 104 (e.g., either native or virtual) from a remote location, e.g., via network 133 and/or other suitable communication medium or media.

It will be understood that the embodiment of FIG. 1 is exemplary only, and that an information handling system may be provided with one or more processing devices that may perform the functions of host processing device/s 106, out-of-band processing device 108, BMC 117, etc. Examples of such processing devices include, but are not limited to, central processing units (CPUs), embedded controllers, microcontrollers, application specific integrated circuits (ASICs), field programmable gate arrays (FPGAs), etc. It will also be understood that the particular configuration of FIG. 1 is exemplary only, and that other information handling system architectures may be employed in the practice of the disclosed systems and methods.

Figure 2:
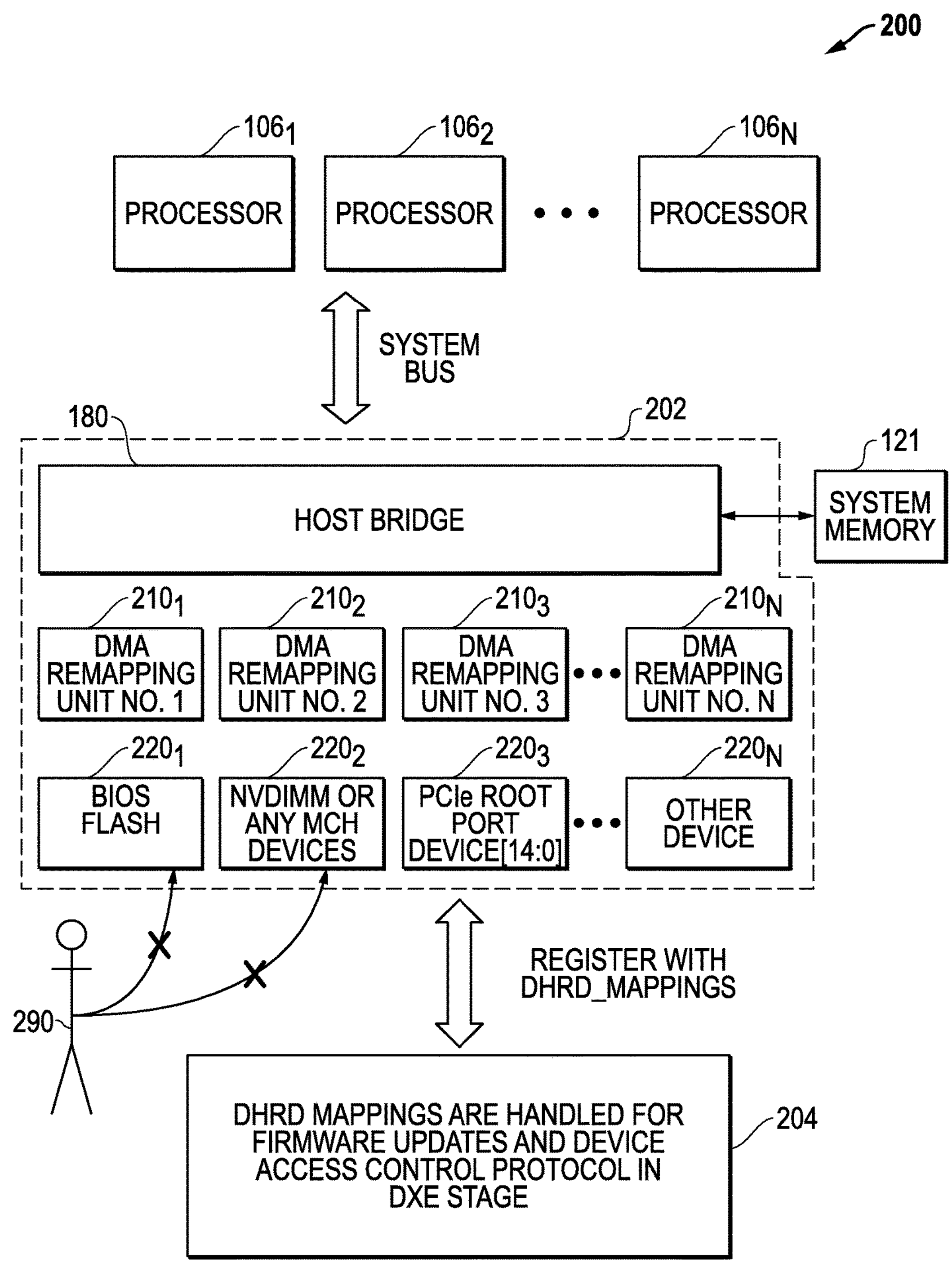
FIG. 2 illustrates one exemplary embodiment of a configuration of processing devices and DMA firmware access remapping components according to one exemplary embodiment of the disclosed systems and methods.

FIG. 2 illustrates one exemplary embodiment of a configuration 200 of processing devices and DMA firmware access remapping components 202 that are configured to implement DMA remapping to control firmware updates and the firmware updating process for an information handling system 104. As shown in FIG. 2, processing device/s 106 are coupled through host bridge 180 to hardware devices, in this case BIOS flash devices $220_1$, system memory devices $220_2$ (e.g., non-volatile random access memory such as NVDIMMs, volatile random access memory such as DIMMs, etc.), PCIe root port devices $220_3$, etc. In the illustrated embodiment, host bridge 180 is coupled between system memory 121 and each hardware device 220 via a respective DMA remapping unit 210 that controls access to system memory 121 as shown, e.g., using DMA remapping hardware that may be integrated in within host processing device 106, host bridge/Northbridge 180, Southbridge/PCH 181, or may alternatively be separate from host processing device 106 and Southbridge/PCH. As illustrated in FIG. 2 and as described further herein, DMA remapping hardware unit definitions (DHRD) may be established and utilized for handling firmware updates and device access control protocol 204 during the DXE stage of preboot operation. In one embodiment, such DHRDs may be contained in and implemented using DMA remapping reporting (DMAR) advanced configuration and power interface table/s that may be stored and utilized by UEFI 142 when executing on processing device/s 106. These established DHRD's may be implemented by respective DMA remapping units 210 to protect a corresponding hardware device 220 during UEFI pre-boot phase from access by malware 290 using DMA remapping to determine whether to allow or disallow pre-boot firmware updates and/or device configuration for hardware devices. As shown, access for firmware updates and/or device configuration is denied to malware 290 as represented by the "Xs" which represent blocking of the access of malware instances 290 to hardware devices $220_1$ and $220_2$.

Figure 3:
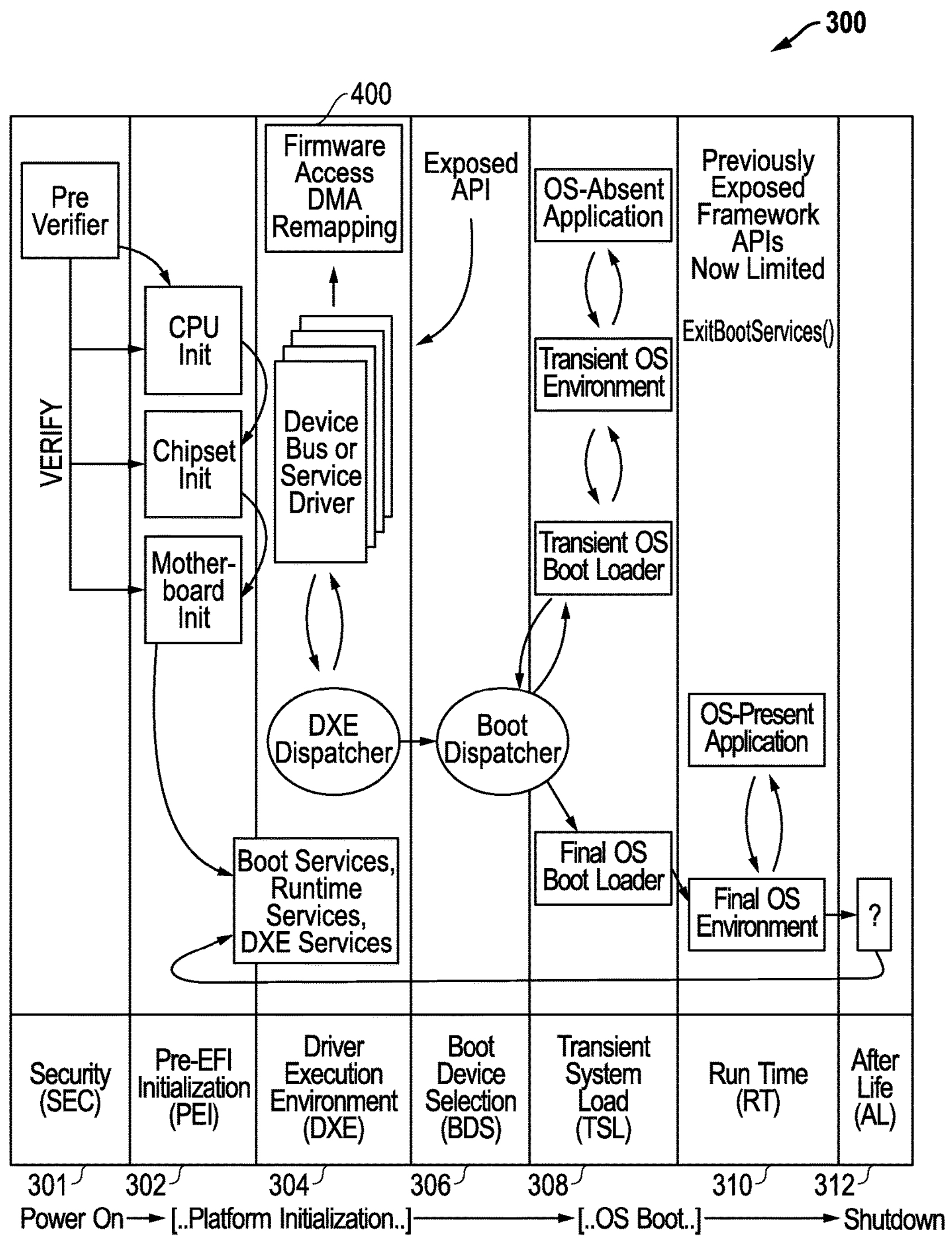
FIG. 3 illustrates UEFI pre-boot methodology with firmware access DMA remapping according to one exemplary embodiment of the disclosed systems and methods.

FIG. 3 illustrates UEFI pre-boot methodology 300 with firmware access DMA remapping during DXE phase that may performed by executing UEFI 142 on host processing device/s 106 of FIG. 1 to load UEFI images (e.g., UEFI Applications, UEFI Drivers, UEFI firmware volumes, etc.). It will be understood that methodology 300 is described in relation to FIG. 1 for purposes of illustration only, and that methodology 300 (as well as methodology 400 of FIG. 4) may be implemented by at least one information handling system processing device with any other suitable combination of information handling system components for loading and executing UEFI images with firmware access DMA remapping to protect access to one or more hardware devices of an information handling system. Moreover, the methodologies of FIGS. 3 and 4 may be performed during UEFI Secure Boot, or may be performed during UEFI booting process without UEFI Secure Boot. UEFI Secure Boot may be implemented by system firmware that checks that the system boot loader is signed with a cryptographic key authorized by a database contained in the firmware to help prevent the execution of unsigned code. UEFI Secure Boot may be implemented, for example, to help prevent the system from executing a modified boot path after such a modification has occurred, and also may simplify detection of such modified boot path.

As shown in FIG. 3, methodology 300 begins at UEFI initialization upon startup or reboot of information handling system 104 with UEFI security (SEC) phase of step 301 in which pre-RAM code is employed for initialization of host processing device 106 to create a temporary stack in host processing device cache to allow the following UEFI phases to proceed. Next, UEFI pre-EFI initialization (PEI) phase of step 302 occurs where host processing device initialization is completed, memory 121 (e.g., DRAM) is discovered and boot mode is determined. Upon completion of UEFI PEI phase 304, UEFI DXE phase 304 occurs as shown, and is employed to load UEFI images, e.g., for initializing the rest of the system hardware of information handling system 104. During DXE phase 304, firmware access DMA remapping routine or methodology 400 may run, and is described further herein in relation to FIG. 4. After completion of UEFI DXE phase in step 304 of FIG. 3, UEFI boot device selection (BDS) phase occurs in step 306, where boot devices are found. UEFI transient system load (TSL) phase may next be performed in step 308 where a transient OS may load to run application/s absent host OS 105, the host OS 105 is loaded by the final OS boot loader, and control is passed to the host OS 105. As shown, TSL 308 may alternatively return to BDS phase 306 or may proceed to OS runtime phase 310 where boot services are exited and final OS 105 is loaded and may run with any application/s as described above. After life (AL) phase 312 occurs after the OS 105 exits, such as when system 104 enters a low power stage, after which methodology 300 may return to PEI phase 302 and 304 as shown such as upon return to higher system power stage.

Figure 4:
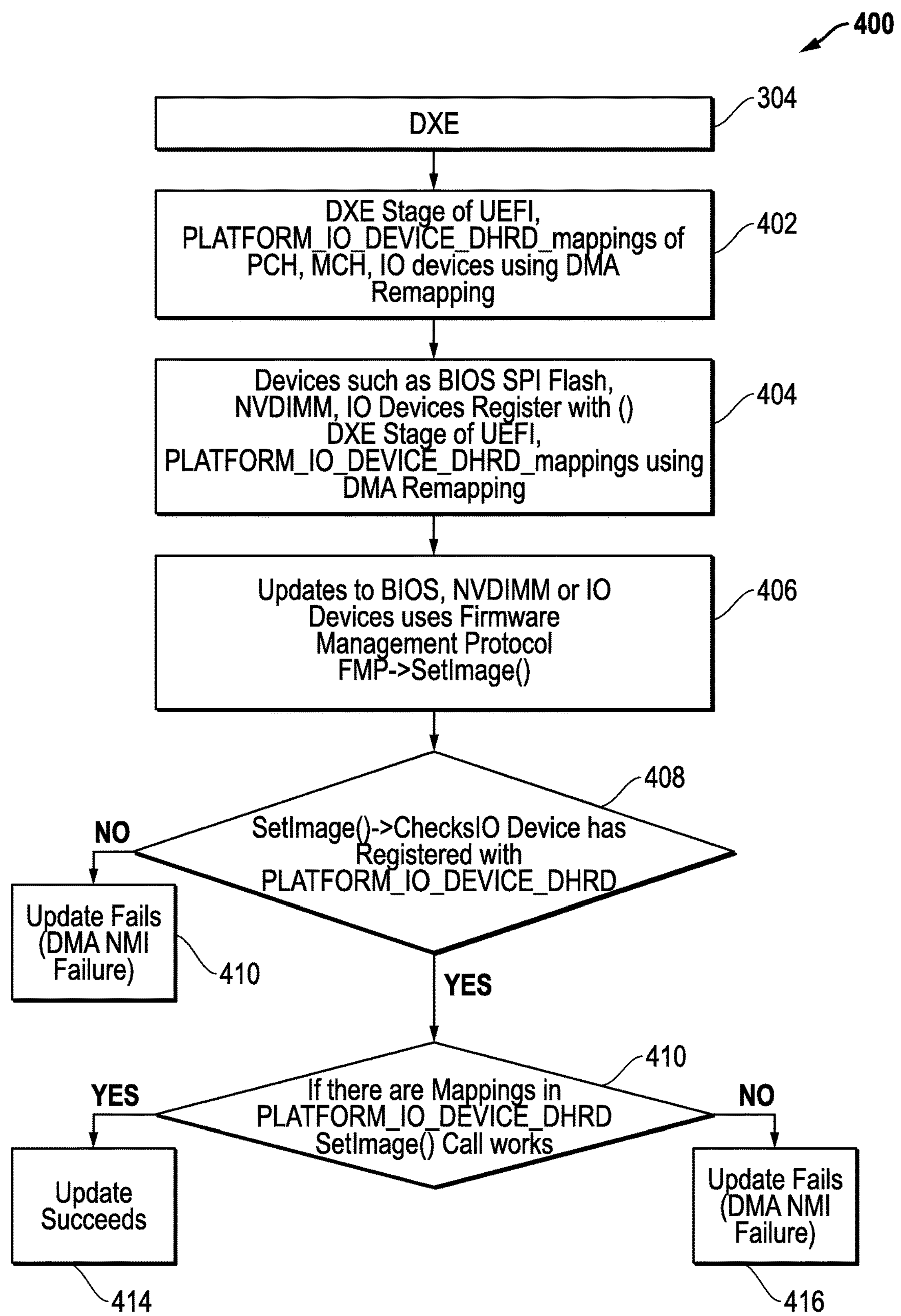
FIG. 4 illustrates firmware access DMA remapping methodology according to one exemplary embodiment of the disclosed systems and methods.
Figure 5:
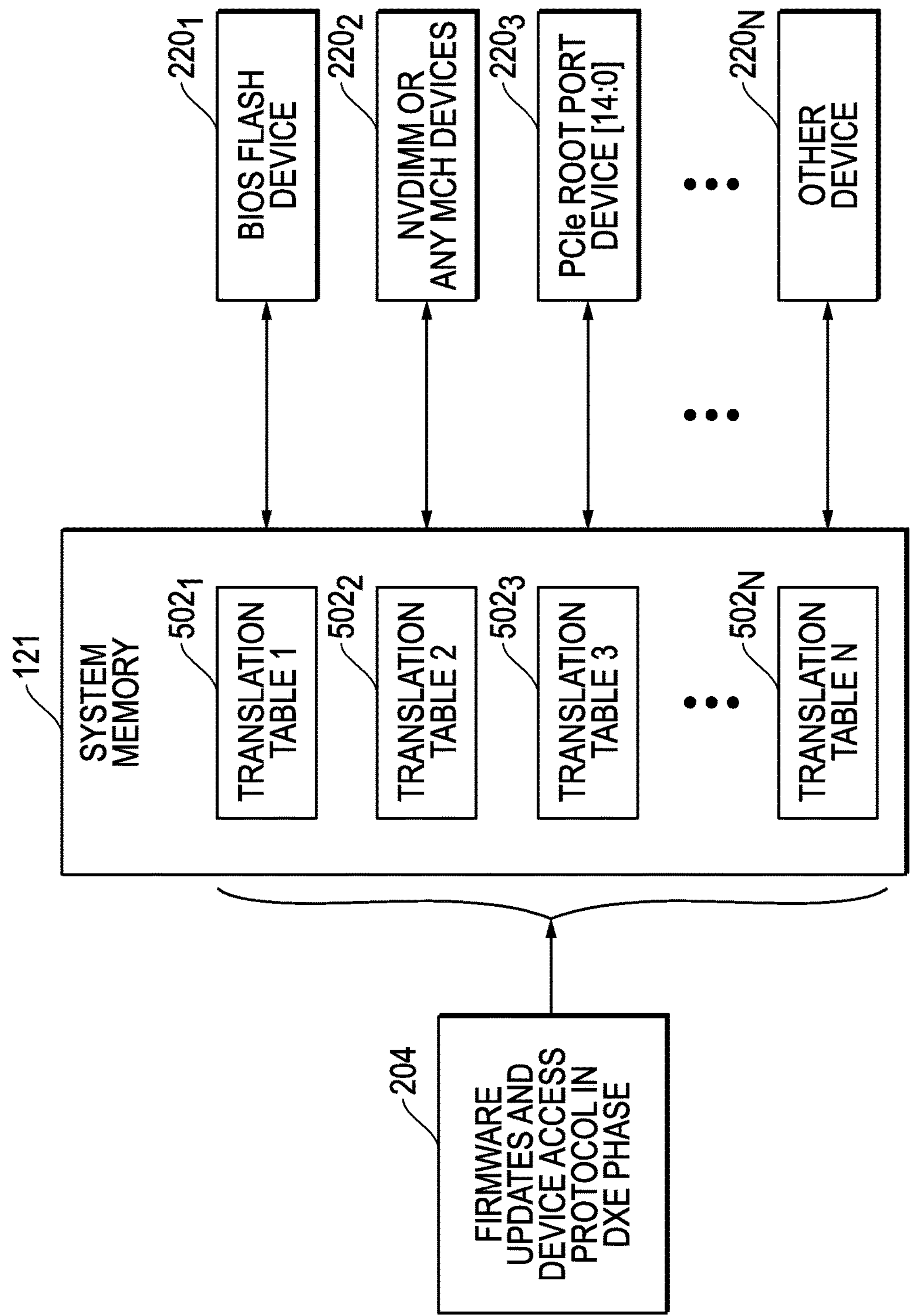
FIG. 5 illustrates translation tables $502_1$ to $502_N$ that may be associated with respective hardware devices according to one exemplary embodiment of the disclosed systems and methods.

Returning now to DXE phase 304, firmware access DMA remapping methodology 400 may be performed in one exemplary embodiment as illustrated in FIG. 4. As shown in FIG. 4, methodology 400 begins with step 402 where platform IO device DHRD mappings are created or otherwise provided for each of DMA remapping units 210 as shown in FIG. 2, e.g., for Northbridge/host bridge connected devices, Southbridge/PCH connected devices, IO devices and any other devices 220 that are to be protected from malware attack during pre-boot operations. This may be performed during DXE boot, for example, by a PLATFORM_IO_DEVICE_PROTOCOL that scans for the presence of particular platform IO devices 220 (e.g., such as original equipment manufacturer "OEM" devices) which may be present. Specific examples of such devices 220 include, but are not limited to, IO Devices, BIOS Flash, MCH, PCIe Devices, etc. The PLATFORM_IO_DEVICE_PROTOCOL (e.g., such as OEM_PROTOCOL) may use the results of this scan to create a map in the DHRD Table for those discovered platform IO devices (e.g., OEM devices) using a suitable DMA remapping technique to control access to I/O devices during pre-OS and pre-boot environment, including DMA remapping techniques that are conventionally employed to remap I/O virtualization in-band for a host operating system (OS) executing on a host processor. Examples of suitable DMA remapping techniques include Intel Virtualization Technology for Directed I/O (VT-d) or any other suitable I/O remapping program, I/O virtualization or methodology that may be implemented to remap device I/O memory addresses in a manner such that these remapped device addresses are only known by UEFI components executing on system 104. Each of the created DHRD mappings of step 402 may have a translation table structure associated with it that translates between firmware-requested memory addresses and actual hardware IO device addresses within system memory during pre-boot operations. Next, in step 404, particular system hardware devices 220 (e.g., such as BIOS SPI flash, NVDIMMS, DIMMS, PCIe Devices, etc.) register with the created PLATFORM_IO_DEVICE_DHRD mappings (e.g., PLATFORM_IO_DEVICE_DHRD mappings) of step 402 using a suitable DMA remapping technique (e.g., such as Intel VT-d). This registration is used to assign a correct respective DHRD translation table for use by the correct DMA remapping unit 210 to handle attempted accesses to a corresponding registered device 220. FIG. 5 illustrates one example of translation tables $\mathbf{502}_1$ to $\mathbf{502}_N$ as they may be associated with respective devices 220 that are to be protected during pre-boot from malware or other unauthorized access attempts 204.

Still referring to FIG. 4, after mappings are created and assigned to registered hardware devices 220 in steps 402 and 404, methodology 400 proceeds to step 406 where a firmware update (or other device access control protocol such as BIOS) 204 for a given current device 220 is attempted during pre-boot, e.g., using FMP 183. In such a case, the attempted firmware payload update or other payload 204 is passed to the device Setimage function that is executed by FMP protocol 183. Then, in step 408, the device Setimage function checks if the current device has registered with PLATFORM_IO_DEVICE_DHRD Mapping in step 404. If not, the attempted update or other access fails in step 410 due to lack of registration. However, if the current device has registered with PLATFORM_IO_DEVICE_DHRD Mapping, then the device Setimage function calls an PLATFORM_IO_DEVICE_DHRD Mapping SetImage( ) and the firmware update (or other device access control protocol) is attempted in step 412 by using address information provided by the firmware update or other device access control protocol 204 and using the corresponding translation table and DMA remapping unit 210 assigned to the current device 220 to remap memory access to the current device 220.

Assuming the firmware update or other device access control protocol 204 has knowledge of the correct DMA address translation in step 412, then the call to the system by the device Setimage works and the update or other configuration access attempt 204 succeeds in step 414. On the other hand, if the firmware update or other configuration access attempt 204 does not know and provide the correct DMA address translation for entry in the corresponding translation table assigned to the current device 220, then the attempted update or other access fails in step 416 with DMA NMI failure as shown. Thus, only attempted firmware updates and other accesses 204 to registered hardware devices 220 are allowed, and only then when the attempted update/access 204 knows and provides the corrected address entry of a given current device 220 that has been corrected using DMA remapping (e.g., Intel VT-d) for DMA address translation for a registered device 220. Any Malware or Hardware probes connected cannot interpret the addresses on the system bus as these addresses are not the actual I/O memory addresses to the devices. It will be understood that any needed configuration/s for devices 220 may also be performed using the same approach, i.e., via function off the PLATFORM_IO_DEVICE_DHRD_Protocol described above which can apply the system configuration of all devices used in a given OEM system configuration, e.g., at the time of manufacture or assembly and/or during field maintenance for an OEM system 104 such as a server.

It will be understood that particular illustrated steps of methodology 400 are exemplary only, and that any other combination of additional, fewer and/or alternative steps may be employed that is suitable for utilizing direct memory access (DMA) remapping to control firmware updates and/or other configuration changes or device access control protocol for devices of an information handling system during a UM pre-boot phase.

It will also be understood that one or more of the tasks, functions, or methodologies described herein (e.g., including those described herein for components 106, 108, 109, 117, 133, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processing device of an information handling system such as CPU, controller, microcontroller, processor, microprocessor, CPLD, FPGA, ASIC, or other suitable processing device) to perform one or more steps of the methodologies disclosed herein. In one exemplary embodiment, such a processing device of the information handling system may be selected from the group consisting of a CPU, controller, microcontroller, processor, microprocessor, FPGA, and ASIC. A computer program of instructions may be stored in or on the non-transitory computer-readable medium accessible by an information handling system for instructing the information handling system to execute the computer program of instructions. The computer program of instructions may include an ordered listing of executable instructions for implementing logical functions in the information handling system. The executable instructions may comprise a plurality of code segments operable to instruct the information handling system to perform the methodology disclosed herein. It will also be understood that one or more steps of the present methodologies may be employed in one or more code segments of the computer program. For example, a code segment executed by the information handling system may include one or more steps of the disclosed methodologies.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system, comprising:

at least one processing device configured to execute a host operating system (OS) for the information handling system; and at least one given hardware device separate from the at least one processing device, the at least one given hardware device being coupled in data communication with the processing device;

where the processing device is configured to receive a requested firmware update for the given hardware device prior to loading the host operating system (OS) for the information handling system, the requested firmware update including a firmware-requested memory address for the given hardware device that is different from the actual hardware IO address for the given hardware device;

where the processing device is configured to respond to the requested firmware update by first determining prior to loading the host operating system (OS) whether the given hardware device has previously registered with DMA remapping information stored in memory of the information handling system for the given hardware device and whether the firmware-requested memory address matches the assigned DMA mapping address translation in the DMA remapping information for the given hardware device;

where the processing device is further configured to then either:

access and utilize the stored direct memory access (DMA) remapping information stored in memory of the information handling system to translate the firmware-requested memory address from the requested firmware update to the actual hardware IO device address for the given hardware device coupled to the processing device to perform a requested firmware update for the given hardware device prior to loading a host operating system (OS) for the information handling system when the processing device first determines prior to loading the host operating system (OS) that the given hardware device has previously registered with the DMA mapping for the given hardware device and determines prior to loading the host operating system (OS) that the firmware-requested memory address matches the assigned DMA mapping address translation for the given hardware device, or prevent the requested firmware update for the given hardware device prior to loading the host operating system (OS) for the information handling system when the processing device determines that the given hardware device has not previously registered with the DMA mapping for the given hardware device or has determined that the firmware-requested memory address does not match the assigned DMA mapping address translation for the given hardware device.

2. The system of claim 1, where the stored DMA remapping information includes a translation between the firmware-requested memory address and an actual hardware IO device address for the given hardware device, the DMA remapping information being stored within a system memory of the information handling system; and where the processing device is further configured to perform the following steps prior to loading the host OS:

receive an access request for the firmware update for the given hardware device and a firmware-requested memory address associated with the access request;

respond to the access request by accessing the stored DMA remapping information; and use the DMA remapping information to translate the firmware-requested memory address to the actual hardware IO device address for the given hardware device to perform the requested firmware update for the given hardware device.

3. The system of claim 2, where the processing device is further configured to perform the following steps prior to loading the host OS:

respond to the access request by accessing stored direct memory access (DMA) remapping information to determine if the given hardware device has been assigned a translation between a firmware-requested memory address and actual hardware IO device address for the given hardware device within the stored DMA remapping information; and then:

not access the system memory to perform the requested firmware update or other requested device access control protocol for the given hardware device if the given hardware device has not been assigned a translation between a firmware-requested memory address and actual hardware IO device address for the given hardware device; and use the DMA remapping information to translate the firmware-requested memory address to the actual hardware IO device address to access the system memory to perform the requested firmware update for the given hardware device if the given hardware device has been assigned a translation between a firmware-requested memory address and actual hardware IO device address for the given hardware device.

4. The system of claim 1, where the processing device is further configured to access and utilize stored direct memory access (DMA) remapping information to translate the firmware-requested memory address to an actual hardware IO device address for the given hardware device and to perform the requested firmware update for the given hardware device during a Driver Execution Environment (DXE) phase of Unified Extensible Firmware Interface (UEFI) pre-boot environment executing on the processing device.

5. The system of claim 1, where the given hardware device comprises at least one of a basic input/output system (BIOS) flash memory device, non-volatile dual inline memory module (NVDIMM), volatile dual inline memory module (DIMM) device, power supply unit (PSU), complex programmable logic device (CPLD), or Peripheral Component Interconnect Express (PCIe) device.

6. The system of claim 1, where the processing device is further configured to identify the presence of hardware devices coupled in data communication with the processing device and including the given hardware device during manufacture or assembly of the information handling system; and to then create DMA mapping for the identified hardware devices to control access to the identified hardware devices prior to loading the host OS.

7. The system of claim 6, where the processing device is further configured to register each identified hardware device including coupled in data communication with the processing device and including the given hardware device;

and to use the created DMA mapping to assign the DMA remapping information to translate a firmware-requested memory address to an actual hardware IO device address to control attempted accesses to the each identified hardware device.

8. The system of claim 1, where the processing device is further configured to use the processing device during a UEFI non-Secure Boot pre-boot environment executing on the processing device to employ the DMA remapping information to generate a non-maskable interrupt (NMI) failure due to unauthorized access attempt to system memory to prevent an attempted access to a particular hardware device when the attempted access does not provide a correct DMA address translation for the particular hardware device.

9. The system of claim 1, where the processing device is further configured to process the requested firmware update using firmware management protocol (FMP) executing on the at least one processing device.

10. The system of claim 1, where the processing device is coupled in data communication with the given hardware device through a host bridge of the information handling system.

11. The system of claim 1, where the processing device is further configured to perform all of the following steps prior to loading the host OS:

scan for the presence of particular platform IO devices including the given hardware device;

then use the results of the scan to create a map in the DMA mapping address translation for the given hardware IO device, the DMA mapping address translation including a remapped device address for the given hardware IO device that is only known by Unified Extensible Firmware Interface (UEFI) components executed by the processing device; and then control access to the hardware IO device by a requested firmware update during a pre-boot environment by using the DMA mapping translation to allow access to the hardware IO device only if the DMA mapping translation successfully translates the firmware-requested memory address from the requested firmware update to the actual hardware IO device address for the given hardware device.

12. A method, comprising using at least one processing device of an information handling system to:

receive a requested firmware update for a given hardware device that is separate from the at least one processing device prior to loading a host operating system (OS) for the information handling system, the requested firmware update including a firmware-requested memory address for the given hardware device that is different from the actual hardware IO address for the given hardware device;

respond to the requested firmware update by first determining prior to loading the host operating system (OS) whether the given hardware device has previously registered with DMA remapping information stored in memory of the information handling system for the given hardware device and whether the firmware-requested memory address matches the assigned DMA mapping address translation in the DMA remapping information for the given hardware device; and then either:

access and utilize the stored direct memory access (DMA) remapping information to translate the firmware-requested memory address from the requested firmware update to the actual hardware IO device address for a given hardware device coupled to the processing device to perform a requested firmware update for the given hardware device prior to loading a host operating system (OS) for the information handling system when the processing device first determines prior to loading the host operating system (OS) that the given hardware device has previously registered with the DMA mapping for the given hardware device and has determined prior to loading the host operating system (OS) that the firmware-requested memory address matches the assigned DMA mapping address translation for the given hardware device, or prevent the requested firmware update for the given hardware device prior to loading the host operating system (OS) for the information handling system when the processing device determines prior to loading the host operating system (OS) that the given hardware device has not previously registered with the DMA mapping for the given hardware device or has determined prior to loading the host operating system (OS) that the firmware-requested memory address does not match the assigned DMA mapping address translation for the given hardware device.

13. The method of claim 12, where the stored DMA remapping information includes a translation between the firmware-requested memory address and an actual hardware IO device address for the given hardware device, the DMA remapping information being stored within a system memory of the information handling system; and where the method further comprises using the processing device to perform the following steps prior to loading the host OS:

receiving an access request for the firmware update for the given hardware device and a firmware-requested memory address associated with the access request;

responding to the access request by accessing the stored DMA remapping information; and using the DMA remapping information to translate the firmware-requested memory address to the actual hardware IO device address for the given hardware device to perfume the requested firmware update for the given hardware device.

14. The method of claim 13, further comprising performing the following steps prior to loading an operating system (OS):

responding to the access request by accessing stored direct memory access (DMA) remapping information to determine if the given hardware device has been assigned a translation between a firmware-requested memory address and actual hardware IO device address for the given hardware device within the stored DMA remapping information; and then:

not accessing the system memory to perform the requested firmware update or other requested device access control protocol for the given hardware device if the given hardware device has not been assigned a translation between a firmware-requested memory address and actual hardware IO device address for the given hardware device; and using the DMA remapping information to translate the firmware-requested memory address to the actual hardware IO device address to access the system memory to perform the requested firmware update for the given hardware device if the given hardware device has been assigned a translation between a firmware-requested memory address and actual hardware IO device address for the given hardware device.

15. The method of claim 12, further comprising using the processing device to access and utilize stored direct memory access (DMA) remapping information to translate the firmware-requested memory address to an actual hardware IO device address for the given hardware device and to perform the requested firmware update for the given hardware device during a Driver Execution Environment (DXE) phase of Unified Extensible Firmware Interface (UEFI) pre-boot environment executing on the processing device.

16. The method of claim 12, where the given hardware device comprises at least one of a basic input/output system (BIOS) flash memory device, non-volatile dual inline memory module (NVDIMM), volatile dual inline memory module (DIMM) device, power supply unit (PSU), complex programmable logic device (CPLD), or Peripheral Component Interconnect Express (PCIe) device.

17. The method of claim 12, further comprising using the processing device to identify the presence of hardware devices including the given hardware device during manufacture or assembly of the information handling system; and to then create DMA mapping for the identified hardware devices to control access to the identified hardware devices prior to loading the host OS.

18. The method of claim 17, further comprising using the processing device to register each identified hardware device including the given hardware device with the created DMA mapping for the identified hardware device; and to use the created DMA mapping to assign the DMA remapping information to translate a firmware-requested memory address to an actual hardware IO device address to control attempted accesses to the each identified hardware device.

19. The method of claim 12, further comprising using the processing device during a UEFI non-Secure Boot pre-boot environment executing on the processing device to employ the DMA remapping information to generate a non-maskabie interrupt (NMI) failure due to unauthorized access attempt to system memory to prevent an attempted access to a particular hardware device when the attempted access does not provide a correct DMA address translation for the particular hardware device.

20. The method of claim 12, further comprising further comprising using the processing device to process the requested firmware update through firmware management protocol (FMP) executing on the at least one processing device.

21. The method of claim 12, where the processing device is coupled in data communication with the given hardware device through a host bridge of the information handling system.

22. The method of claim 12, further comprising using the at least one processing device of the information handling system to perform all of the following steps prior to loading the host OS:

scan for the presence of particular platform IO devices including the given hardware device;

then use the results of the scan to create a map in the DMA mapping address translation for the given hardware IO device, the DMA mapping address translation including a remapped device address for the given hardware IO device that is only known by Unified Extensible Firmware Interface (UEFI) components executed by the processing device; and then control access to the hardware IO device by a requested firmware update during a pre-boot environment by using the DMA mapping translation to allow access to the hardware IO device only if the DMA mapping translation successfully translates the firmware-requested memory address from the requested firmware update to the actual hardware IO device address for the given hardware device.

* * * * *